United States Patent
Brake et al.

(10) Patent No.: US 6,561,179 B1
(45) Date of Patent: May 13, 2003

(54) GAS GRILL AND METHOD OF ASSEMBLING THE GRILL

(75) Inventors: George R. Brake, Dickson, TN (US); Shawn Minshall, Dickson, TN (US)

(73) Assignee: Fiesta Gas Grills, Inc., Dickson, TN (US)

( * ) Notice: Subject to any disclaimer, the term of this patent is extended or adjusted under 35 U.S.C. 154(b) by 88 days.

(21) Appl. No.: 09/903,416

(22) Filed: Jul. 11, 2001

Related U.S. Application Data
(60) Provisional application No. 60/218,002, filed on Jul. 12, 2000.

(51) Int. Cl.⁷ ............................. A47J 37/00; A47J 37/07
(52) U.S. Cl. ................. 126/41 R; 126/304 R; 126/305; 126/50
(58) Field of Search ................. 126/25 R, 40, 126/50, 39 B, 55, 304 R, 305, 41 R; 108/189, 190, 193, 186, 185; 312/351.31, 351.11, 306; D7/332, 334; 248/129; 211/153, 182

(56) References Cited

U.S. PATENT DOCUMENTS

| | | | |
|---|---|---|---|
| 5,408,985 A | * 4/1995 | Giebel et al. | 126/41 R |
| 5,572,983 A | * 11/1996 | Schlosser et al. | 126/25 R |
| 5,579,755 A | * 12/1996 | Johnston | 126/41 R |
| 5,623,866 A | * 4/1997 | Home | 99/444 |
| 5,666,941 A | * 9/1997 | Teufel et al. | 126/41 R |

\* cited by examiner

Primary Examiner—Carl D. Price
(74) Attorney, Agent, or Firm—Waddey & Patterson; I. C. Waddey, Jr.

(57) ABSTRACT

A gas grill that is structurally engineered such that it can be easily and rapidly assembled by a person of limited technical ability in a simplified manner with only a single open end wrench. The gas grill of the present invention comprises a base or bottom shelf, four legs, four casters, a firebox, a main upper body, a burner assembly, a pivotable door or lid, a rock grate, briquette or lava rock, a cooking grid, one or more warming racks, two side shelves, one or more front panels, a pair of side panels, a propane assembly, and a valve assembly. The firebox, main upper body, and the legs of the gas grill of the present invention are secured together by a plurality of externally threaded bolts which pass through openings in the main upper body, the firebox and the upper end portion of each leg.

20 Claims, 9 Drawing Sheets

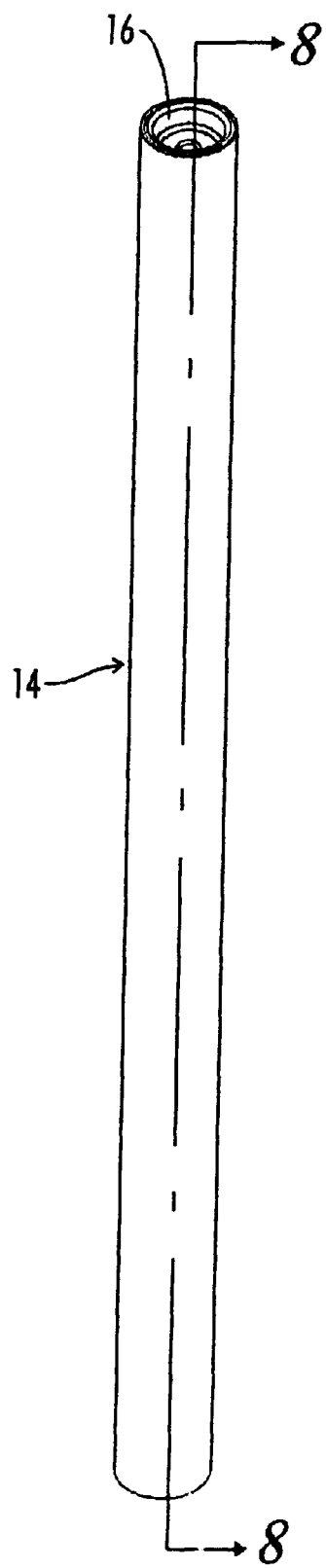
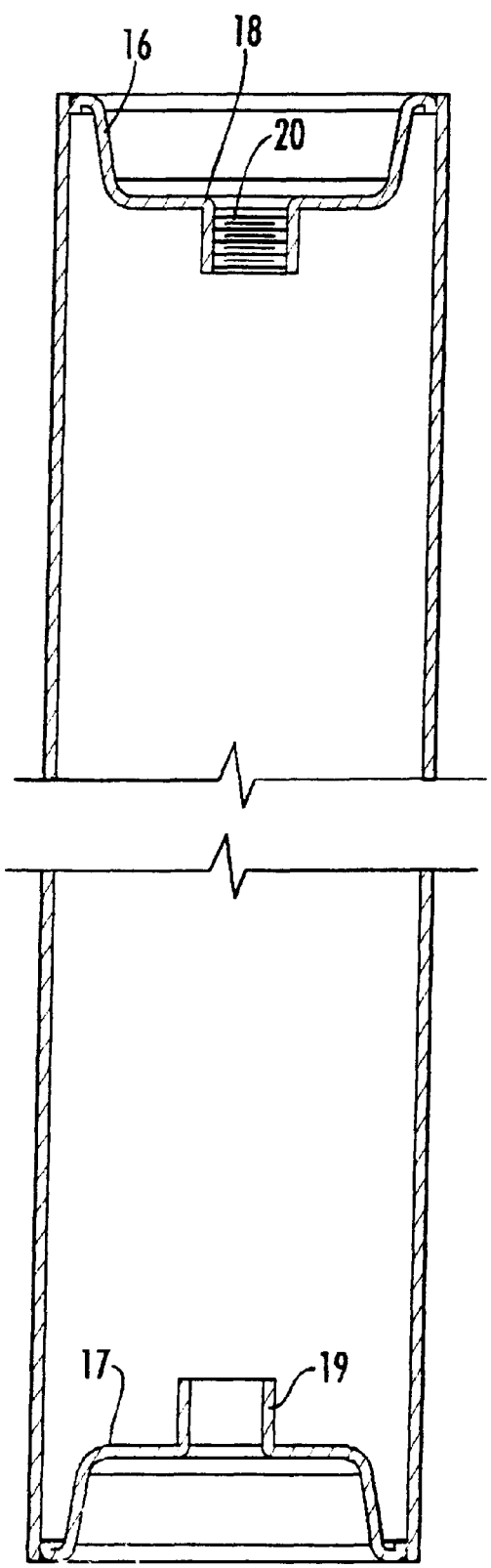
FIG. 7
FIG. 8

GAS GRILL AND METHOD OF ASSEMBLING THE GRILL

This application claims benefit of co-pending Provisional U.S. Patent Application, Serial No. 60/218,002, filed Jul. 12, 2000, entitled "Improved Gas Grill And Method Of Assembling The Grill".

TECHNICAL FIELD

The present invention relates generally to a cooking device and its method of assembly, and more particularly to an improved gas grill for cooking food and the method of assembling same.

BACKGROUND OF THE INVENTION

Gas grills are very popular for outdoor cooking. They generally comprise a cart, a firebox or cooking chamber, a cover for the firebox or cooking chamber, one or more gas burners, controls for the gas burners, lava rock or briquettes, one or more propane (gas) cylinders, cooking grid, side shelves or burners, and perhaps one or more warming racks. Numerous models exist in all types, styles, sizes and shapes. While some are pre-assembled, most must be assembled by the consumer or owner. The assembly of a gas grill can range from fairly easy to extremely difficult and normally are labor and tool intensive.

In a continuous effort to improve upon current designs and products, add new features, and ensure ease of assembly of the grill with minimum tools, the present invention was developed.

The assembly of the instant invention is structurally engineered such that it can be easily and rapidly assembled by a person having limited technical ability without the use of numerous tools and in a simplified manner. All that is needed to assemble the grill of the present invention is an open end wrench. The gas grill of the present invention has tremendous curb appeal with real advantages being in its simplistic assembly through the use of four externally threaded bolts.

SUMMARY OF THE INVENTION

The gas grill of the present invention is structurally engineered such that it can be easily and rapidly assembled by a person having limited technical ability without the use of numerous tools and in a simplified manner as only a single open end wrench is required during the assembly process.

The gas grill of the present invention in its preferred embodiment generally comprises a base or bottom shelf, four legs, four casters, a firebox, a main upper body, a burner assembly, a pivotable door or lid, a rock grate, briquette or lava rock, a cooking grid, one or more warming racks, two side shelves, one or more front panels, two side panels, a propane cylinder, and a valve assembly. The principal components of the preferred embodiment of the gas grill of the present invention can be easily assembled and held together by a few externally threaded bolts which pass through respective openings in the firebox, the main upper body, and internal threads in the upper end portions of the legs.

There is a real need for a gas grill that can be easily assembled by a person of limited technical ability and that does not require a lot of tools to assemble same. The gas grill of the present invention fulfills these needs.

Accordingly, it is an object of the present invention to provide a new and improved gas grill that can be easily and efficiently manufactured and assembled without the need for many tools.

It is a further object of the present invention to provide a new and improved gas grill wherein it major components can be rapidly assembled by an inexperienced person with limited technical ability.

It is yet a further object of the present invention to provide a new and improved gas grill whose major components are assembled and held together by a plurality of threaded bolts passing through openings therein.

Other objects, features and advantages of the present invention will become more readily apparent from the following detailed description taken in conjunction with the accompanying drawings.

BRIEF DESCRIPTION OF THE DRAWINGS

FIG. 7 is a perspective view of one of the four legs of the improved and easy to assemble gas grill of the present invention.

FIG. 8 is a partially broken away and in cross-section, view taken along line 8—8 of FIG. 7 showing some of the details of the lowermost portion and uppermost portion of one of the four legs of the improved and easy to assemble gas grill of the present invention.

DESCRIPTION OF THE PREFERRED EMBODIMENT

Figure 1:
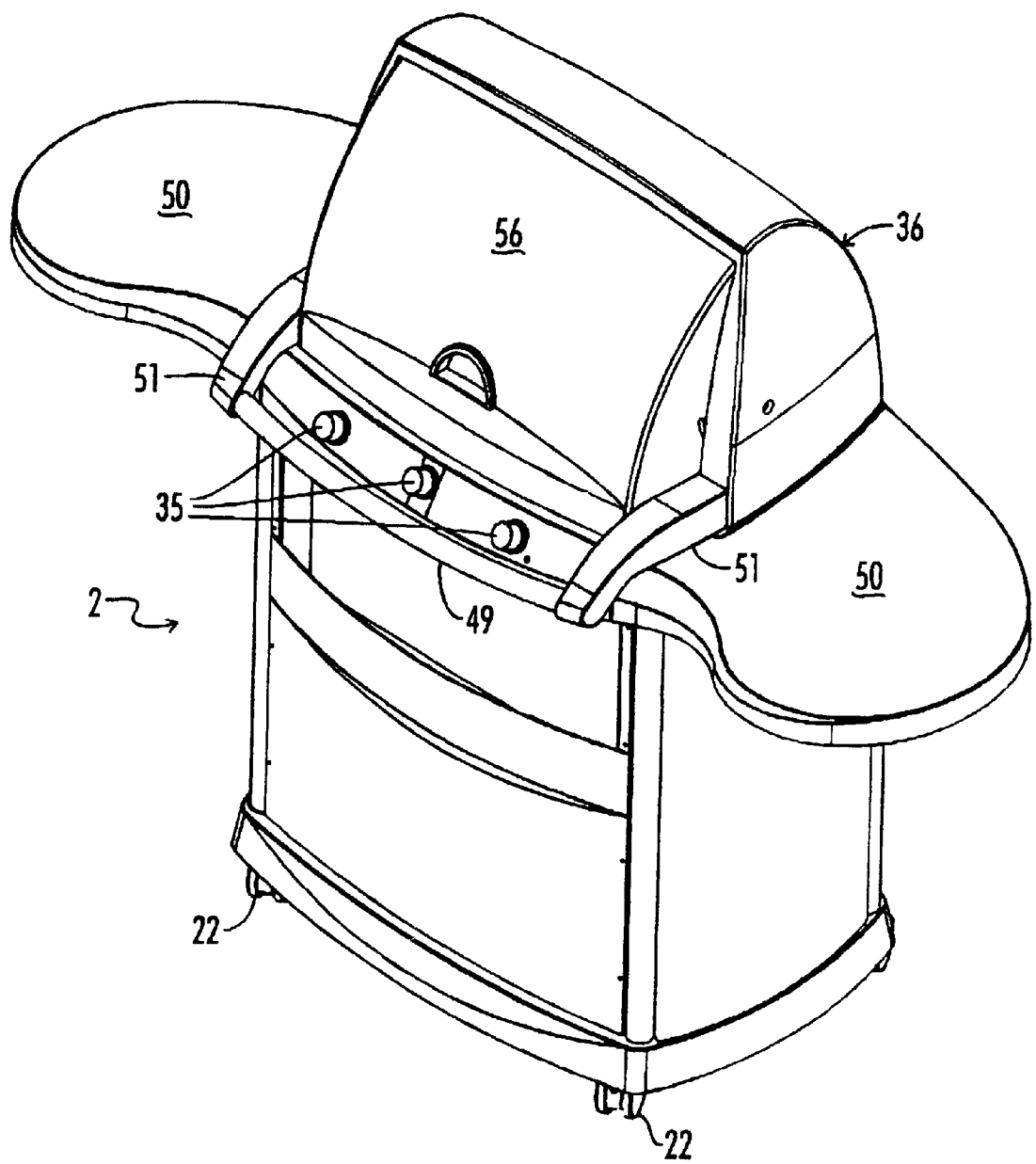
FIG. 1 is a perspective view of the improved and easy to assemble gas grill of the present invention.

Referring now to the drawings, particularly FIG. 1 thereof, reference numeral 2 designates an assembled gas grill of the present invention. Referring now to FIGS. 1, 2, and 19–21, the major components of the gas grill 2 generally comprise a base or bottom shelf 4, four legs 14, four casters 22, a firebox 26, a main upper body 36, a burner assembly 68, a pivotable door or lid 56, an electric igniter 72, a rock grate 74, briquette or lava rock 76, a cooking grid 78, one or more warming racks 80, two side shelves 50, one or more front panels 84, two side panels 86, a propane cylinder 88, and a valve assembly 90.

Figure 2:
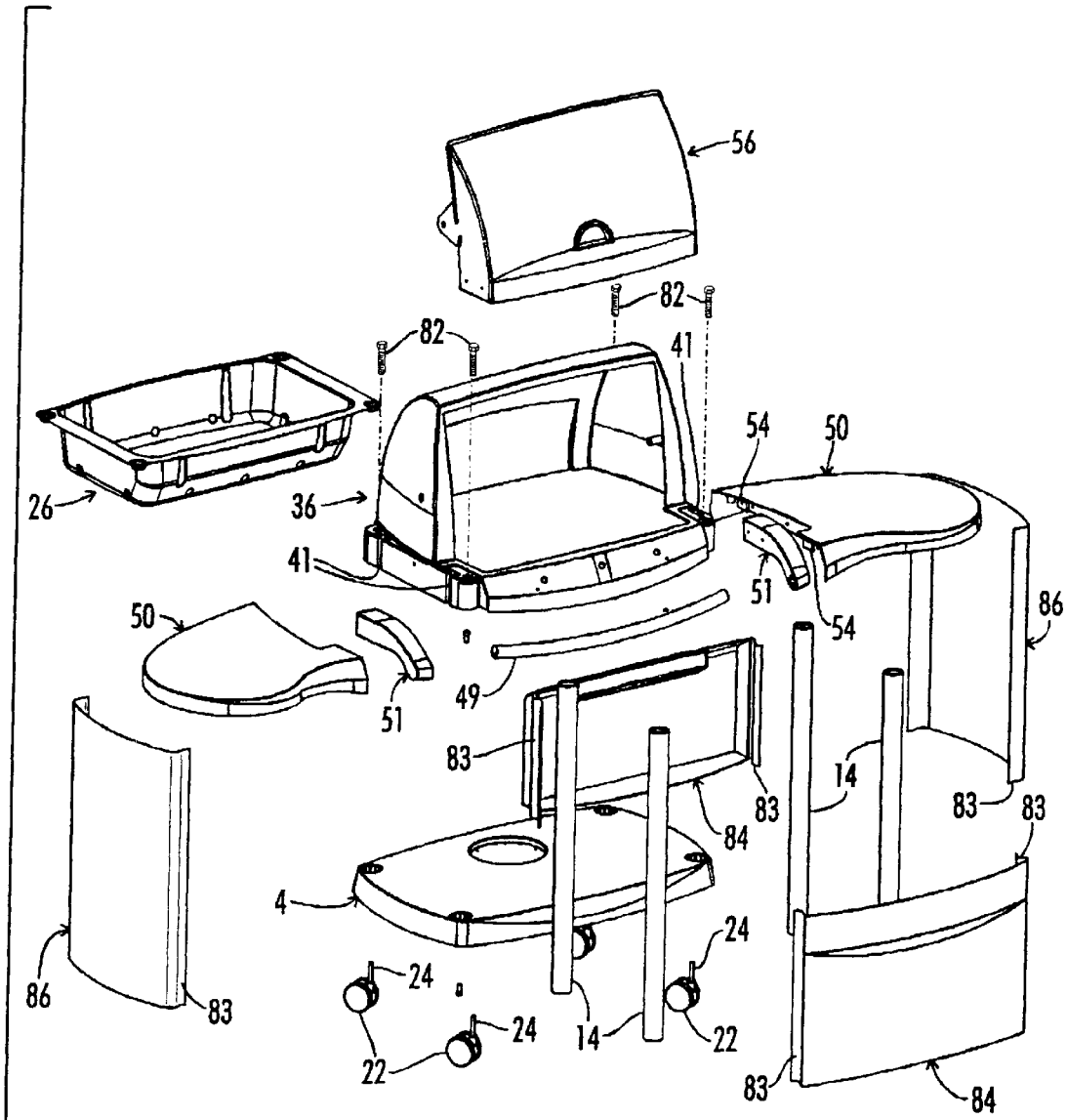
FIG. 2 is an exploded view of many of the components of the improved and easy to assemble gas grill of the present invention.

As best seen in FIG. 2, the ends of each of the two front panels 84 and the two side panels 86 are shaped in a semi-circular configuration 83 on their vertical sections for purposes to be later explained.

Figure 3:
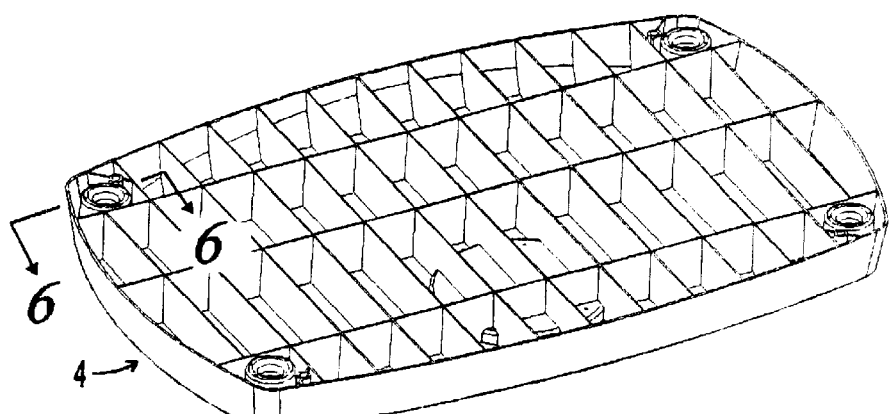
FIG. 3 is a perspective view of the bottom of the base or bottom shelf of the improved and easy to assemble gas grill of the present invention.
Figure 4:
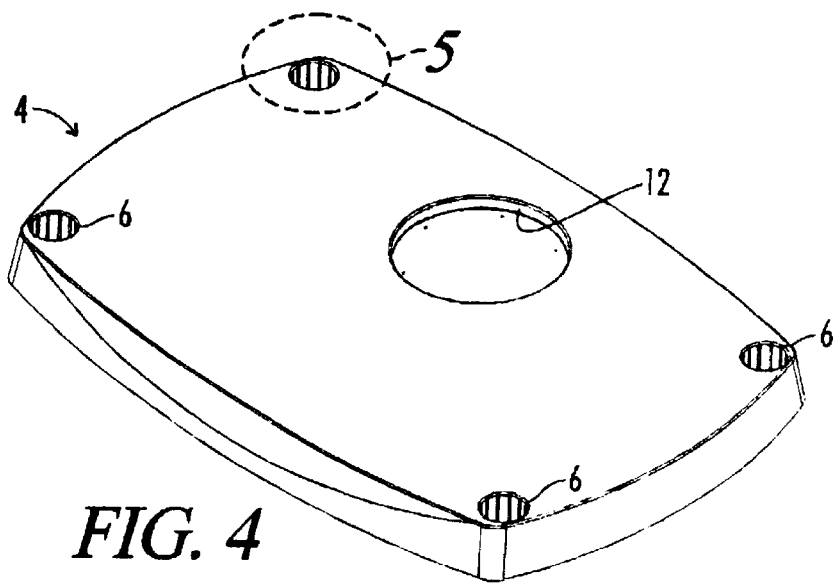
FIG. 4 is a perspective view of the top of the base or bottom shelf of the improved and easy to assemble gas grill of the present invention.
Figure 5:
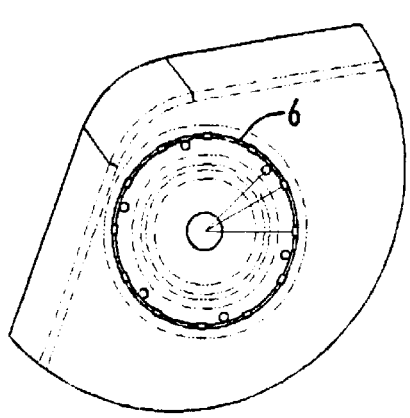
FIG. 5 is a top plan view of one of the four corners showing an opening in the base or bottom shelf of the improved and easy to assemble gas grill of the present invention.
Figure 6:
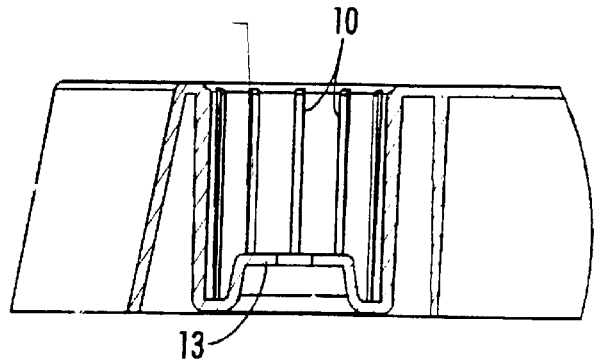
FIG. 6 is a partially broken away and in cross section view of one of the openings in one corner of the base or bottom shelf of the improved and easy to assemble gas grill of the present invention.

As best seen in FIGS. 3–6, the base or bottom shelf 4 is preferably rectangular and includes four hollow pockets or sockets 6 adjacent its corners and a recessed portion or opening 12 spaced some distance from the four hollow pockets or sockets 6. Each hollow pocket or socket 6 includes a series of spaced ribs 8 and a reduced threaded opening 10 for purposes to be later explained. The recessed portion or opening 12 of the base or bottom shelf 4 is round as best seen in FIGS. 3 and 4 and is generally closed at its bottom. As best seen in FIGS. 7 and 8, each leg 14 is generally hollow and has an insert 16 in its upper end (unnumbered) and an insert 17 in its lower end (unnumbered). As best seen in FIG. 8, each insert 16 has a reduced portion 18 with internal threads 20 for purposes to be later explained. As best seen in FIG. 8, each insert 17 has a reduced portion (unnumbered) with an opening 19 for purposes to be later explained. As best seen in FIG. 2, each caster 22 has a stem 24 for purposes to be later explained.

Figure 9:
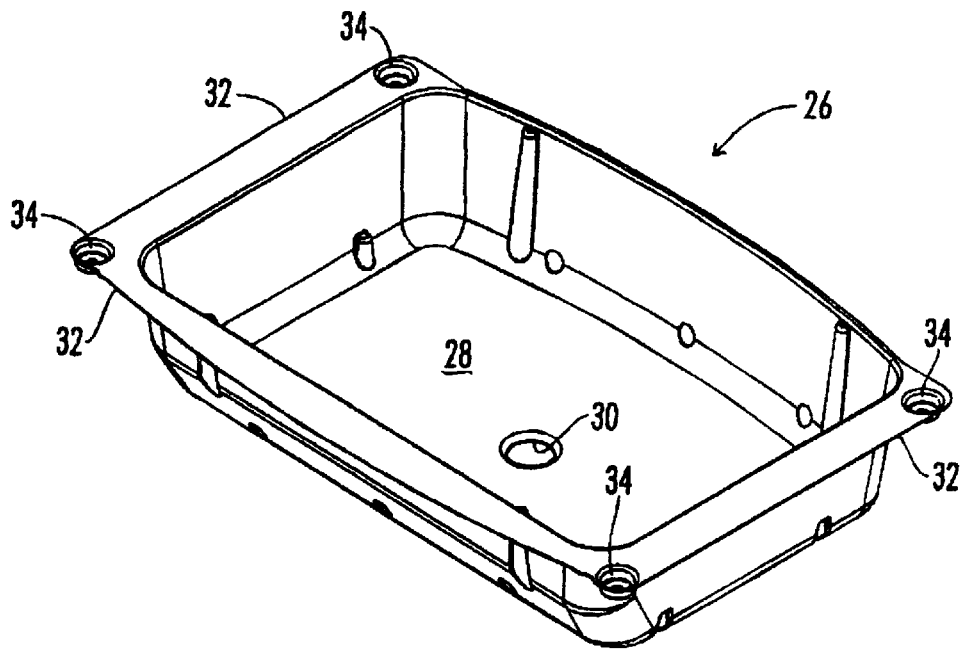
FIG. 9 is a perspective top view of the tub-shaped burner box or firebox of the improved and easy to assemble gas grill of the present invention.
Figure 10:
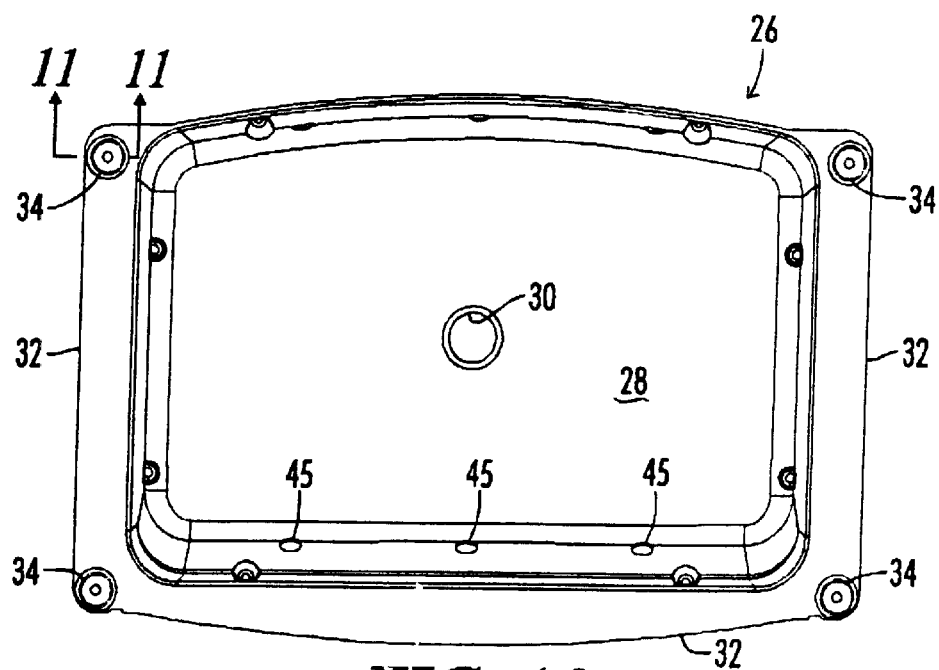
FIG. 10 is a top plan view of the tub-shaped burner box or firebox of the improved and easy to assemble gas grill of the present invention.
Figure 11:
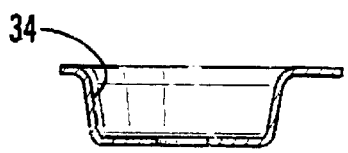
FIG. 11 is a cross-section view taken along line 11—11 of FIG. 10 showing some of the details of one of the four openings in the outer periphery of the tub-shaped burner box or firebox of the improved and easy to assemble gas grills of the present invention.
Figure 12:
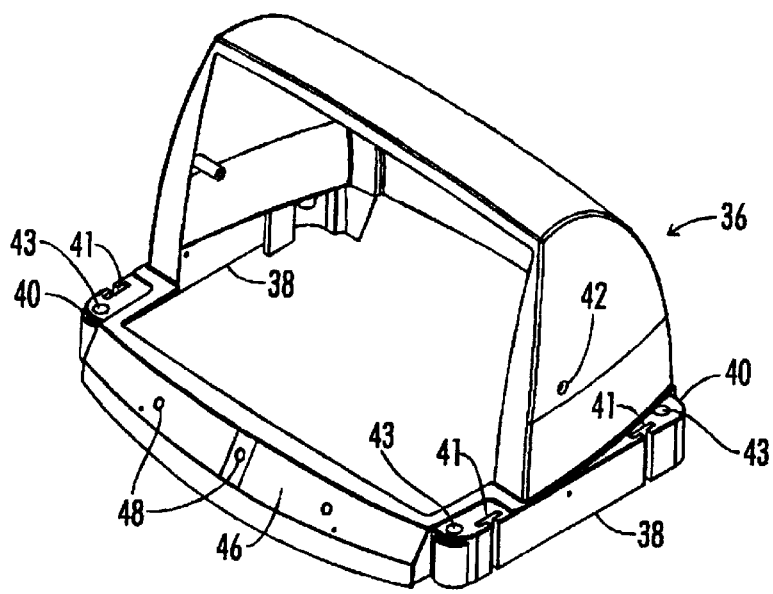
FIG. 12 is a perspective view of the main upper body of the improved and easy to assemble gas grill of the present invention.
Figure 13:
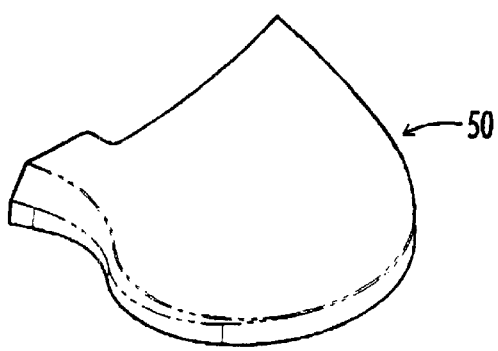
FIG. 13 is a top perspective view of the right hand side shelf of the improved and easy to assemble gas grill of the present invention. (The left hand side shelf is a mirror image of the right hand side shelf.)
Figure 15:
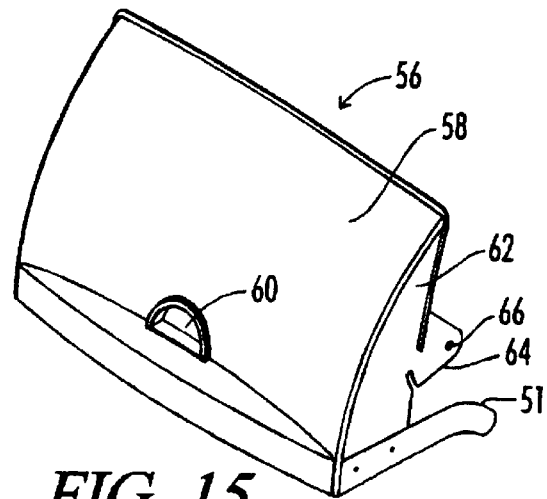
FIG. 15 is a front perspective view of a pivotable door or lid of the improved and easy to assemble gas grill of the present invention.
Figure 14:
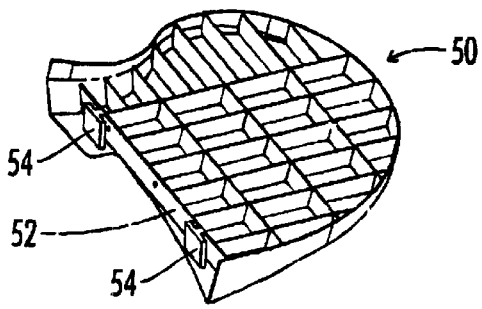
FIG. 14 is a bottom perspective view of the right hand side shelf of the improved and easy to assemble gas grill of the present invention. (The left hand shelf is mirror image of the right hand shelf.)
Figure 16:
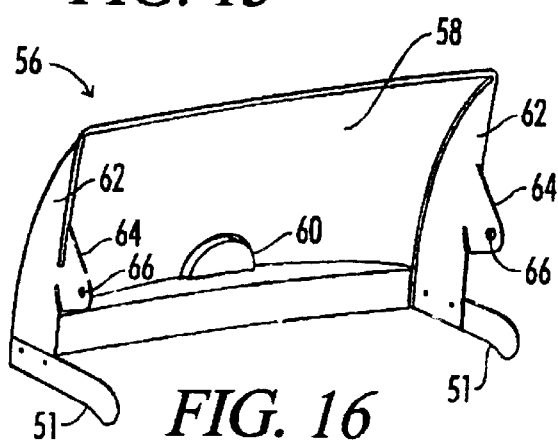
FIG. 16 is a rear perspective view of the pivotable door or lid of the improved and easy to assemble gas grill of the present invention.
Figure 17:
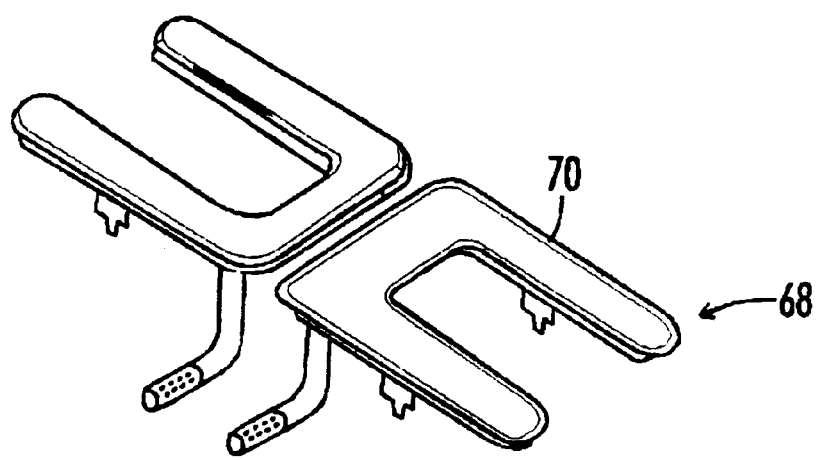
FIG. 17 is a perspective view of a burner assembly which might be used in the improved and easy to assemble gas grill of the present invention.
Figure 18:
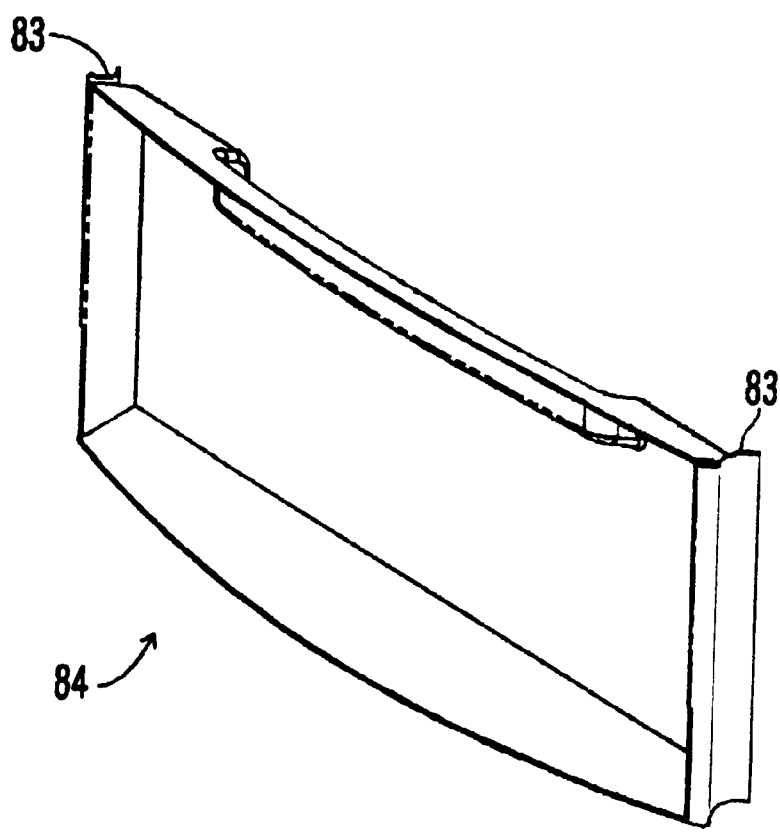
FIG. 18 is a front perspective view of the upper front cover for the housing of the improved and easy to assemble gas grill of the present invention.
Figure 19:
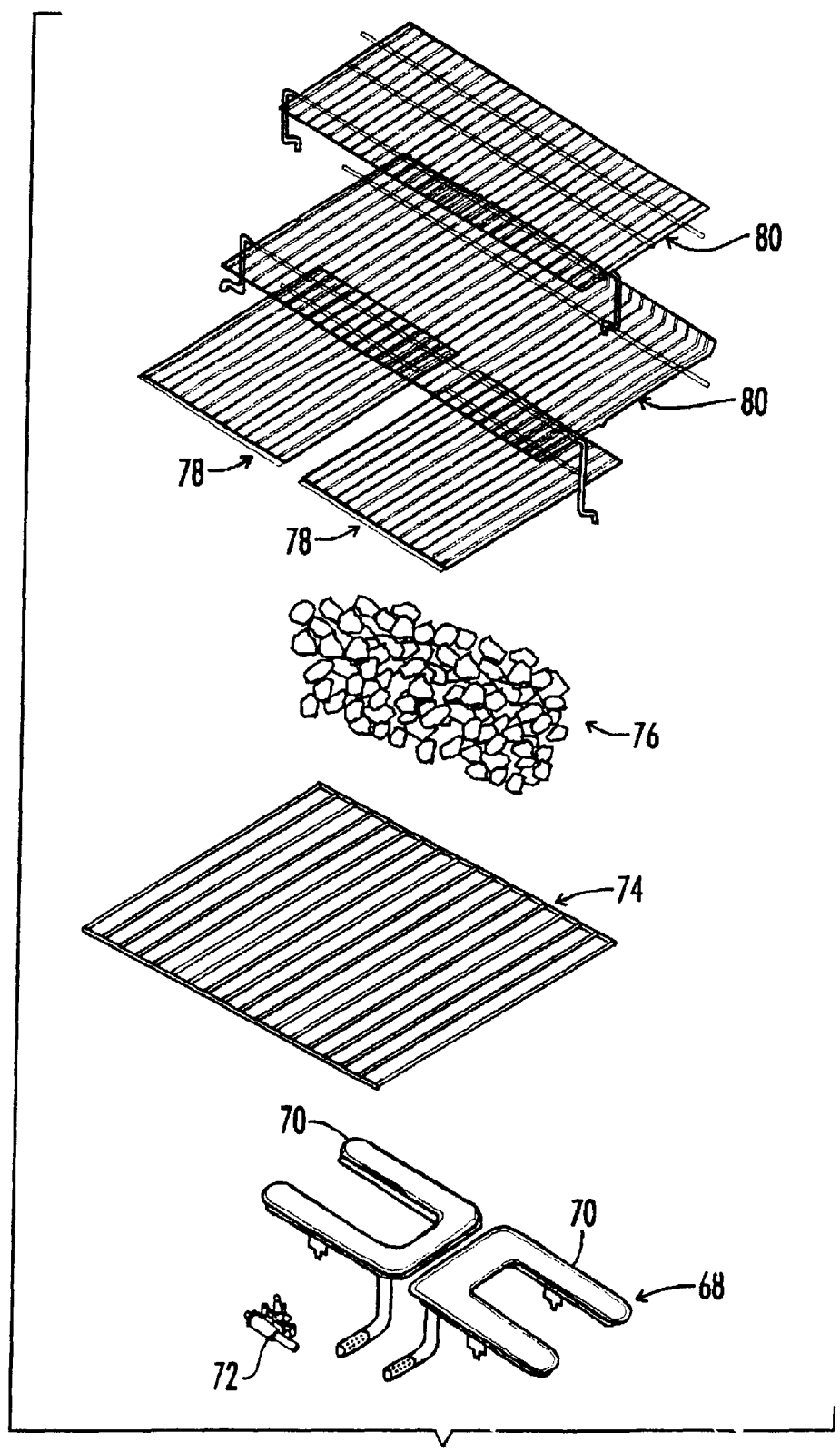
FIG. 19 is an exploded perspective view showing the electric igniter, the burner assembly, the rock grate, the briquette or lava rock, the cooking grid, and the warming racks which might be used in the improved and easy to assemble gas grill of the present invention.
Figure 20:
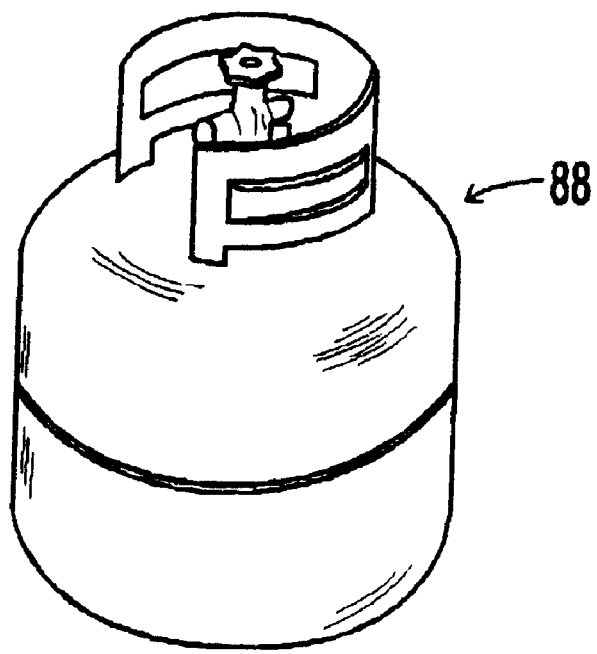
FIG. 20 is a perspective view of a conventional propane cylinder for use with the gas grill of the present invention.

As best seen in FIGS. 9–11, the firebox 26 is generally rectangular and tub shaped and includes a bottom 28 having a central opening 30 therein, an upper lip or flange 32 which partially extends therearound, an opening 34 in the flange or lip 32 in each of the four corners of the firebox 26 and several openings 45 in the front wall (unnumbered) of the firebox 26 for mating with the openings 45 of the front wall of the firebox 26 and the openings 48 in the console 46 for receiving control mechanisms 35 (FIG. 1) for the burner assembly 68. As best seen in FIG. 12, the upper main body 36 is generally rectangular with each of its two smaller sides 38 including a pair of lips or flanges 40, each of which has one or two slots or grooves 41 therein and four openings 43 adjacent its periphery. Further, as best seen in FIG. 12, the upper body 36 has a console 46 along its front with a number of openings 48 therein for receiving control mechanisms 35 for the burner assembly 68. As best seen in FIGS. 13 and 14, each side shelf 50 is odd-shaped and has a flange 52, each having one or two male projections or tabs 54 for mating with a respective slot or groove 41 (FIG. 12) on the lips or flanges 40 of the main upper body 36 (FIG. 12). FIGS. 13 and 14 depict a right hand shelf 50 which is a mirror image of the left hand shelf 50. As best seen in FIGS. 15 and 16, reference numeral 56 designates the grill door or lid which includes a curved front 58, a recessed area 60 for receiving a temperature gage or logo, a pair of side portions 62, each of which includes a bracket 51 secured to each of the side portions 66 by any suitable means such as bolts, screws or the like and having an opening (unnumbered) for receiving an end of a handle 49 (FIG. 1) and an extension 64 having an opening 66 therein for purposes to be later explained. As best seen in FIG. 17, the burner assembly 68 includes a plurality of burners 70. As best seen in FIG. 19, gas grill 2 includes an igniter 72, a rock grate 74, briquette or lava rock 76, one or more cooking grids 78, and one or more warming racks 80. As should be apparent, the burner assembly 68 with its burners 70, the rock grate 74, the briquette or lava rocks 76, and the one or more cooking grids 78 are positioned within the firebox 26 with the rock grate 74 and the cooking grids 78 being supported by projections (not shown) extending inwardly from the side and/or end walls of the firebox 26.

The components of the gas grill 2 of the present invention can be easily assembled by the following general process with the use of one open end wrench.

1. The base or bottom shelf 4 as best shown in FIGS. 3–6 is positioned as shown in FIG. 4, at which time the lower end of each leg 14 is inserted within a socket or pocket 6 of the base or bottom shelf 4 such that the legs 14 protrude upwardly. The assembled unit (the bottom shelf 4 and the legs 14) is then turned 180° so that the legs 14 protrude downwardly.

2. The stem 24 of a caster 22 is then secured to the each insert 17 in one end of each leg 14 by a press fit.

3. With the four casters 22 secured to the legs 14 and the base or bottom shelf 4 by a press fit, that assembled unit (the bottom shelf 4, the legs 14 and the casters 22) is turned 180° such that the free ends of the four legs 14 protrude upwardly.

4. The semi-circular ends 83 of each of the front panels 84 and the side panels 86 are engaged with a respective leg 14 and slid down the respective leg 14 to be captured thereby and secured in place.

5. The tub shaped firebox 26 is then placed onto the legs 14 such that each of its four openings 34 is in alignment with the threads 20 of a respective insert 16 in the upper end of respective legs 14.

6. The main upper body 36 is then placed onto the tub shaped firebox 26 such that each of its four openings 43 is in alignment with respective openings 34 in tub shaped firebox 26 and the threaded openings 20 in respective inserts 16 in the upper end of each leg 14.

7. The main upper body 36, the tub shaped firebox 26, and the legs 14 will then be secured together by placing a bolt 82 within the openings 34 and 43 and the internal threads 20 of the insert 16 in each leg 14 to be thereby tightened by an open end wrench.

8. Each of the right hand and left hand shelves 50 will then be attached to the unit assembled up to this point by engaging mating male projections or tabs 54 incorporated in the shelves 50 and the female slots or grooves 41 incorporated in the lips or flanges 40 of the main upper body 36.

Figure 21:
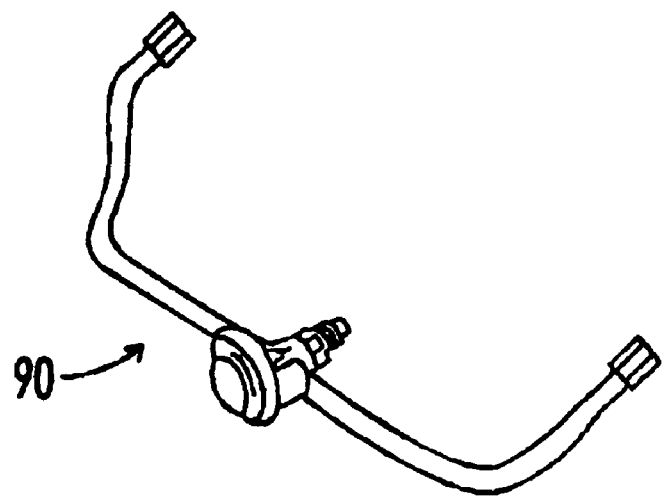
FIG. 21 is a conventional hose/regulator assembly which might be used with the gas grill of the present invention.

9. The assembler will then place the burner assembly 68 in the firebox 26 (if it has not already been placed there at the factory); install a conventional hose/regulator assembly 90 and gas valve as generally shown in FIG. 21 and connect same to the burner assembly 68 and the propane tank or cylinder 88 (FIG. 20); install a rock grate 74 and briquette or lava rock 76 on protrusions in firebox 26; install a cooking grid 78 on protrusions in firebox 26; install one or more warming racks 80; and pivotally connect the door or lid 56 at its openings 66 in the extension 64 to the main upper body 36 at its openings 42 by a bolt and nut or the like. The grill 2 is now fully assembled and ready to use in a very short time by an inexperienced person or in substantially less than ten minutes by an experienced person.

Preferably, each of the bottom shelf 4, the firebox 26, the main upper body 36, and the side shelves 50 is made in one piece as a casting, stamping, or even injection molded where temperature allow. The burner assembly 68, the igniter 72, the propane cylinder 88 and the hose/regulator assembly 90 are shown for illustrative purposes as any such conventional components could be incorporated in the gas grill 2. As should be apparent, a conventional side burner could be added to one of the side shelves 50 for cooking purposes.

While the above description constituted one possible way of making and assembling the gas grill 2 of the present invention, it is apparent that there may be variations or modifications that would still come within the scope and spirit of the invention. For example, there may be a reversal of parts between the male and female members; and two or more components, such as the firebox 26 and the lower half of the main upper body or casting 36 could be made in a single piece, while at the same time making the pivoting lid 56 and the upper portion of the main upper body or casting 36 in a single piece.

We claim:

1. An easy to assemble gas grill comprising:
   a bottom shelf having a plurality of hollow pocket means therein;
   a plurality of legs including upper and lower end portions having openings therein, each said lower end portion of each said leg having means for securement to a respective said hollow pocket means in said bottom shelf;
   a firebox mounted upon said upper end portion of each said leg and having a plurality of openings in alignment with a respective said opening in said upper end portion of each said leg;
   a main upper body mounted upon said firebox and having a plurality of openings in alignment with respective said openings in said firebox and respective said openings in said upper end portion of said legs;
   means for passing through a respective said opening in said main upper body, a respective said opening in said firebox, and a respective said opening in said upper end portion of a respective said leg for securing said main upper body and said firebox to said upper end portions of said legs;
   a burner assembly mounted in said firebox;
   a rock grate mounted in said firebox above said burner assembly; and
   a cooking grid mounted in said firebox above said rock grate.

2. The easy to assemble gas grill of claim 1 wherein said gas grill further comprises a plurality of side shelves.

3. The easy to assemble gas grill of claim 2 wherein said gas grill of claim 2 further includes means for securing each said side shelf to said main upper body.

4. The easy to assemble gas grill of claim 3 wherein said gas grill further comprises a plurality of casters, each said caster includes a stem for engaging the walls of a respective said opening in each said lower end portion of each said bottom shelf.

5. The easy to assemble gas grill of claim 4 wherein the walls of each said opening in said upper end portion of each said leg has internal threads.

6. The easy to assemble gas grill of claim 5 wherein said means for passing through respective said openings in said main upper body, said firebox, and a respective said opening in a respective said leg includes a bolt having a head and external threads for mating with said internal threads in said upper end portions of said legs.

7. The easy to assemble gas grill of claim 6 wherein said means for securing each said side shelf to said main upper body includes at least one female groove and one male tab and wherein the said secured shelves cover said heads of said bolts.

8. The easy to assemble gas grill of claim 7 wherein said gas grill further comprises a door having means thereon for pivotally securing said door to said main upper body.

9. The easy to assemble gas grill of claim 8 wherein said firebox, said main upper body, and said side shelves are made by castings.

10. An easy to assemble gas grill comprising:
    a generally rectangular bottom shelf having a plurality of hollow pocket means in its corners;
    a plurality of hollow legs including upper and lower end portions having openings therein, each said opening in said upper end portion of said leg includes an insert mounted therein having internal threads, and each said lower end portion of each said leg including means for securement to a respective said hollow pocket means in said bottom shelf;
    a generally rectangular, tub-shaped, firebox mounted upon said upper end portion of each said leg and having a plurality of openings in its corners in alignment with a respective said opening in said upper end portion of each said leg;
    a generally rectangular main upper body mounted upon said firebox and having a plurality of openings in its corners in alignment with respective said openings in said firebox and respective said openings in said upper end portion of said legs;
    bolt means having heads and external threads for passing through a respective said opening in said generally rectangular main upper body, a respective said opening in said generally rectangular, tub-shaped, firebox, and a respective said opening in said upper end portion of a respective said leg for securing said generally rectangular main upper body and said firebox to said upper end portions of said legs;
    a burner assembly mounted in said firebox;
    a rock grate mounted in said firebox above said burner assembly; and
    a cooking grid mounted in said firebox above said rock grate.

11. The easy to assemble gas grill of claim 10 wherein said gas grill further comprises a plurality of side shelves.

12. The easy to assemble gas grill of claim 11 wherein said gas grill of claim 11 further includes means for securing each said side shelf to said generally main upper body.

13. The easy to assemble gas grill of claim 12 wherein said gas grill further comprises a plurality of casters, each said caster includes a stem for engaging the walls of a respective said opening in each said lower end portion of each said bottom shelf.

14. The easy to assemble gas grill of claim 13 wherein the walls of each said opening in said upper end portion of each said leg has internal threads.

15. The easy to assemble gas grill of claim 14 wherein said means for securing each said side shelf to said main upper body includes at least one female groove and one male tab.

16. The easy to assemble gas grill of claim 15 wherein said gas grill further comprises a door having means thereon for pivotally securing said door to said main upper body.

17. The easy to assemble gas grill of claim 16 wherein said firebox, said main upper body, and said side shelves are made by castings.

18. A method for assembling a gas grill, said method comprising the steps of:

providing a bottom shelf having a plurality of hollow pockets in its upper side;

providing a plurality of legs, each including upper and lower end portions having openings therein with an insert in each said end portion, each said insert in each said upper end portion having internal threads;

placing said lower end portion of each said leg into a respective said hollow pocket in said bottom shelf;

rotating said bottom shelf and said legs one hundred eighty degrees such that said legs extend downwardly;

providing a plurality of casters, each with a protruding stem;

placing and press fitting the stem of each said caster into a respective said hollow pocket in said bottom shelf to secure each said caster to each said leg;

rotating said bottom shelf, said plurality of legs and said casters one hundred eighty degrees such that each said legs extends upwardly;

providing a tub-shaped firebox having a plurality of openings and placing same upon said upwardly extending legs such that each respective said opening in said firebox is in alignment with a respective said opening and insert in a respective said upper portion of a respective said leg;

providing a main upper body having a plurality of openings and placing same upon said firebox such that each of said opening in said main upper body is in alignment with respective said opening in said firebox and a respective said opening in said upper end portion in said leg;

providing a plurality of bolts having external threads and passing each said bolt through a respective said opening in said main upper body, a respective said opening in said firebox, and a respective said opening in said upper end portion of a respective said leg, until the external threads on each respective said bolt engages the internal threads of the respective said insert in said upper end portion of a respective leg;

applying a wrench to each said bolt to tighten each said bolt to thereby secure said main upper body, said firebox and said legs to form an integral unit;

providing a burner assembly and placing it into said tub-shaped firebox;

providing a rock grate and placing it in said tub-shaped firebox above said burner assembly;

providing a plurality of lava rock and placing them on said rock grate;

providing a cooking grid and placing it in said tub-shaped firebox above said lava rock and said rock grate;

providing a propane cylinder and mounting it upon said bottom shelf; and providing a hose/regulator assembly and connecting same to said burner assembly.

19. The method of claim 18 wherein a pair of side shelves are provided for securement to said main upper body.

20. The method of claim 19 wherein a door is provided for being pivotally mounted to said main upper body.

* * * * *